(12) United States Patent
    Kasuga et al.

(10) Patent No.: US 10,343,306 B2
(45) Date of Patent: Jul. 9, 2019

(54) ORGANIC MATERIAL REMOVING DEVICE

(71) Applicant: HITACHI CHEMICAL COMPANY, LTD., Tokyo (JP)

(72) Inventors: Keiichi Kasuga, Tokyo (JP); Shinichi Kawasumi, Tokyo (JP); Kazuhito Kobayashi, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/742,352

(22) PCT Filed: Mar. 8, 2016

(86) PCT No.: PCT/JP2016/057156
§ 371 (c)(1),
(2) Date: Jan. 5, 2018

(87) PCT Pub. No.: WO2017/154099
PCT Pub. Date: Sep. 14, 2017

(65) Prior Publication Data
US 2018/0370077 A1    Dec. 27, 2018

(51) Int. Cl.
*B29B 17/02* (2006.01)
*B01J 16/00* (2006.01)
(Continued)

(52) U.S. Cl.
CPC .......... *B29B 17/0206* (2013.01); *B01J 16/00* (2013.01); *B09B 3/00* (2013.01); *B09B 3/0016* (2013.01);
(Continued)

(58) Field of Classification Search
CPC .................. B01J 16/00; B09B 3/0016; B29B 2017/0293; B29B 17/0206; B01D 11/0215; B01D 11/0288
See application file for complete search history.

(56) References Cited

U.S. PATENT DOCUMENTS

2011/0065817 A1    3/2011 Van Weynbergh et al.

FOREIGN PATENT DOCUMENTS

JP    H10-314713 A    12/1998
JP    11-060796 A    3/1999
(Continued)

OTHER PUBLICATIONS

Machine Translation of JP 2013-006948 A.*
(Continued)

*Primary Examiner* — Lessanework Seifu
(74) *Attorney, Agent, or Firm* — Fitch, Even, Tabin & Flannery, LLP

(57) ABSTRACT

An organic material removing device includes: a container for storing a composite material containing an inorganic material and an organic material decomposable by a treatment liquid; a treatment tank including an accommodation portion for accommodating the container, a treatment liquid inflow portion for allowing the treatment liquid to flow in, and a treatment liquid outflow portion for allowing the treatment liquid to flow out; temperature control means for heating or cooling the treatment liquid; and a treatment liquid circulation means for allowing the treatment liquid to flow in from the treatment liquid inflow portion into the treatment tank and allowing the treatment liquid in the treatment tank to flow out from the treatment liquid outflow portion.

13 Claims, 7 Drawing Sheets

(51) Int. Cl.
  *B09B 3/00* (2006.01)
  *C08J 11/16* (2006.01)
  *C08J 11/18* (2006.01)
  *D06B 9/00* (2006.01)

(52) U.S. Cl.
  CPC ............. *B09B 3/0083* (2013.01); *C08J 11/16* (2013.01); *C08J 11/18* (2013.01); *D06B 9/00* (2013.01); *B29B 2017/0293* (2013.01); *Y02W 30/705* (2015.05); *Y02W 30/706* (2015.05)

(56) References Cited

FOREIGN PATENT DOCUMENTS

| | | |
|---|---|---|
| JP | 2001-172426 A | 6/2001 |
| JP | 2007-246831 | 9/2007 |
| JP | 2011-520004 | 7/2011 |
| JP | 2013-006948 A | 1/2013 |
| JP | 2013-082850 A | 5/2013 |
| JP | 2013-091694 A | 5/2013 |

OTHER PUBLICATIONS

Machine Translation of JP 2013-082850 A.*
International Search Report for PCT/JP2016/057156 dated May 17, 2016; English translation submitted herewith (5 pages).

* cited by examiner

ORGANIC MATERIAL REMOVING DEVICE

CROSS-REFERENCE TO RELATED APPLICATIONS

This application is a U.S. national phase application filed under 35 U.S.C. § 371 of International Application No. PCT/JP2016/057156, filed Mar. 08, 2016, designating the United States, which is hereby incorporated herein by reference in its entirety.

TECHNICAL FIELD

The present invention relates to an organic material removing device.

BACKGROUND ART

Composite materials obtained by combining an organic material such as resin and an inorganic material such as carbon fiber are used in a variety of fields. Examples of such a composite material include a carbon fiber reinforced plastic (CFRP) containing a resin and carbon fiber, a glass fiber reinforced plastic (GFRP) including a resin and glass fiber, a molded coil including a resin and a metal part, a motor coil including a varnish and a conductive coil, and a prepreg for producing CFRP, GFRP, or the like.

Since the amount of waste of CFRP, GFRP, molded coils, motor coils, prepregs, and the like which are composite materials is huge, a variety of technologies have been researched and developed for the purpose of recycling.

For example, Japanese Patent Application Laid-Open (JP-A) No. 2013-82850 discloses a continuous type dissolution treatment apparatus. Further, JP-A No. 2013-82850 discloses a batch type dissolution treatment apparatus as a conventional example.

SUMMARY OF INVENTION

Technical Problem

However, in any of the continuous type dissolution treatment apparatus and the batch type dissolution treatment apparatus disclosed in JP-A No. 2013-82850, it may be difficult to bring a treatment liquid thoroughly into contact with a composite material. In this case, insufficient dissolution of an organic material occurs, part of the organic material remains adhered to the inorganic material to be recovered from the composite material, and the quality of the recovered inorganic material may be inferior in some cases. In order to solve the problem of the organic material remaining in the inorganic material, the processing time may be increased.

The invention has been made in view of the above-described conventional problems, and an object thereof is to provide an organic material removing device capable of efficiently removing an organic material from a composite material.

Solution to Problem

One embodiment of the invention for achieving the above object is as follows.

The organic material removing device of the embodiment is an organic material removing device including: a container for storing a composite material containing an inorganic material and an organic material decomposable by a treatment liquid; a treatment tank including an accommodation portion for accommodating the container, a treatment liquid inflow portion for allowing the treatment liquid to flow in, and a treatment liquid outflow portion for allowing the treatment liquid to flow out; temperature control means for heating or cooling the treatment liquid; and a treatment liquid circulation means for allowing the treatment liquid to flow in from the treatment liquid inflow portion into the treatment tank and allowing the treatment liquid in the treatment tank to flow out from the treatment liquid outflow portion.

In the organic material removing device of the embodiment, a container storing a composite material containing an inorganic material and an organic material decomposable by a treatment liquid is accommodated in an accommodation portion in a treatment tank. In the treatment tank, the treatment liquid inflow portion and the treatment liquid outflow portion are provided. When the treatment liquid flows in from the treatment liquid inflow portion into the treatment tank by the treatment liquid circulation means, the treatment liquid filling the accommodation portion of the treatment tank flows out from the treatment liquid outflow portion.

Therefore, in the accommodation portion of the treatment tank, a flow of the treatment liquid from the treatment liquid inflow portion toward the treatment liquid outflow portion is formed, so that the treatment liquid is easily brought into contact with the composite material. By efficiently contacting the treatment liquid with the composite material, the decomposition efficiency of the organic material decomposed by the treatment liquid contained in the composite material is improved. Further, a decomposed product of the decomposed organic material is efficiently removed from the inorganic material by the treatment liquid. As a result, in the organic material removing device of the embodiment, the organic material can be efficiently removed from the composite material.

In the organic material removing device of the embodiment, the treatment liquid inflow portion may be provided on a lower side in a vertical direction with respect to the accommodation portion of the treatment tank, and the treatment liquid outflow portion may be provided on an upper side in the vertical direction with respect to the accommodation portion of the treatment tank. When the treatment liquid inflow portion is provided on the lower side in the vertical direction with respect to the accommodation portion of the treatment tank, and the treatment liquid outflow portion is provided on the upper side in the vertical direction with respect to the accommodation portion of the treatment tank, the treatment liquid flows upward in the treatment tank, which makes it easy for the treatment liquid to uniformly come into contact with the composite material. For this reason, the decomposition efficiency of the organic material decomposed by the treatment liquid contained in the composite material is improved. Further, the treatment liquid inflow portion of the treatment tank can be prevented from being clogged by the inorganic material from which the organic material is removed.

In the organic material removing device of the embodiment, the treatment tank may be provided with a rectifying means for rectifying the treatment liquid between the accommodation portion and the treatment liquid inflow portion. When the treatment tank has a rectifying means between the accommodation portion and the treatment liquid inflow portion, uneven flow can be prevented from occurring in the treatment liquid flowing into the treatment tank from the treatment liquid inflow portion. Therefore, the treatment liquid is more efficiently brought into contact with the composite material, and the organic material can be more efficiently removed from the composite material.

In the organic material removing device of the embodiment, the container may be provided with a weir member for arranging the composite material along a flow direction of the treatment liquid. By providing the weir member in the container, the composite material can be arranged in the container such that the direction of the composite material stored in the container is along the flow direction of the treatment liquid. Therefore, the treatment liquid is more efficiently brought into contact with the composite material, and the organic material can be more efficiently removed from the composite material.

Advantageous Effects of Invention

According to the invention, an organic material removing device capable of efficiently removing an organic material from a composite material can be provided.

DESCRIPTION OF EMBODIMENTS

Figure 1:
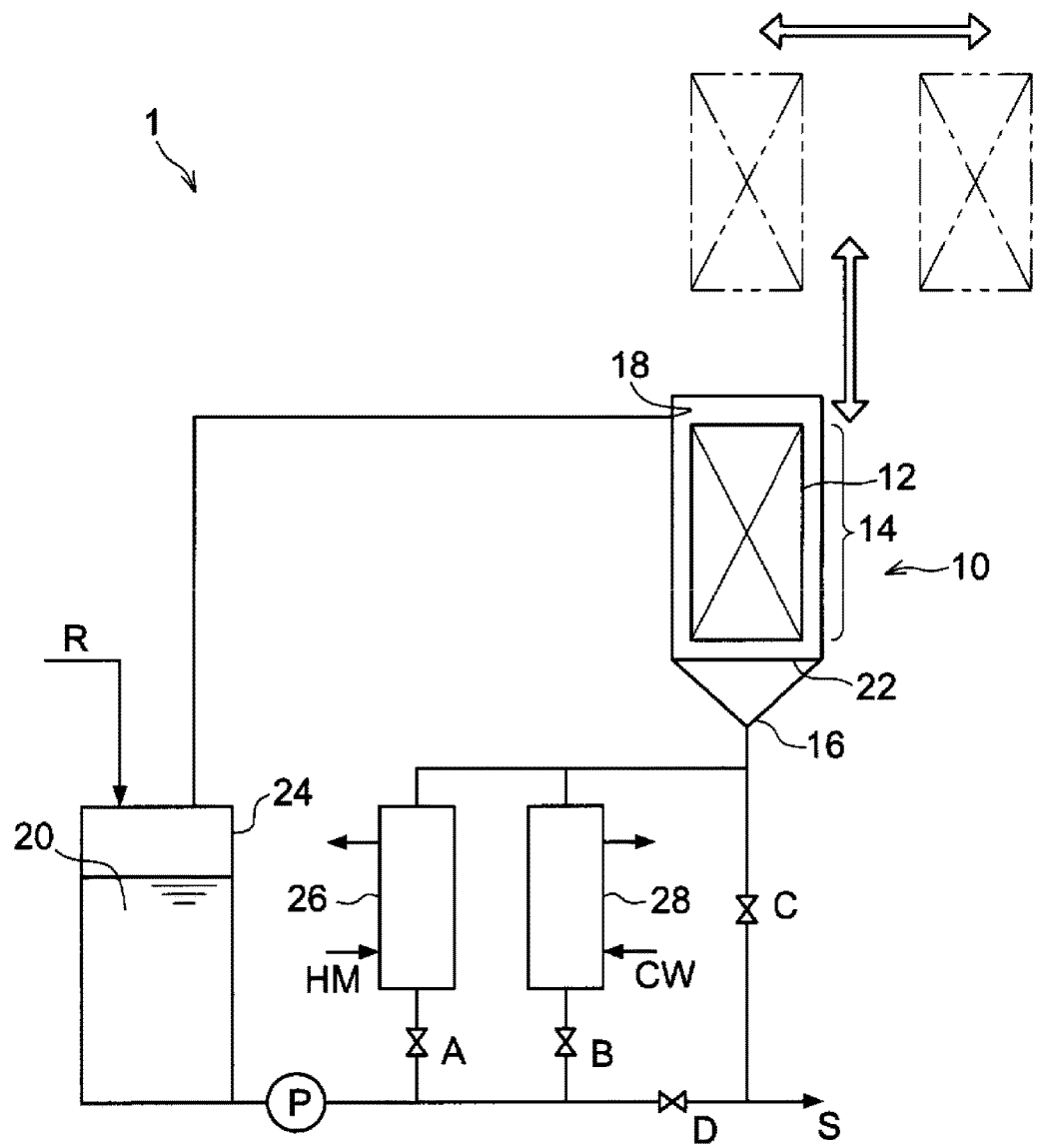
FIG. 1 is a schematic diagram illustrating a main part of an organic material removing device 1 as an example of the embodiment.

Hereinafter, embodiments of the organic material removing device of the invention will be described in detail. However, the present invention is not limited to the following embodiments. In the following embodiments, the constituent elements (including element steps and the like) are not indispensable unless otherwise specified. The same applies to numerical values and ranges thereof, and does not limit the invention.

As used herein, the term "step" includes a step independent from other steps, and a step in which the purpose of the step can be achieved even when the step can not be clearly distinguished from other steps.

As used herein, a numerical range indicated using "to" includes numerical values described before and after "to" as the minimum value and the maximum value, respectively.

In stepwise-described numerical ranges herein, the upper limit value or the lower limit value described in one numerical range may be replaced with the upper limit value or the lower limit value of other stepwise-described numerical ranges.

The sizes of the members in the drawings are conceptual, and the relative relationship between the sizes of the members is not limited thereto. The same reference numerals are given to the members having substantially the same function throughout the drawings, and redundant explanation may be omitted in some cases.

FIG. 1 is a schematic diagram illustrating a main part of an organic material removing device 1 which is an example of the embodiment. In FIG. 1, an embodiment in which the treatment liquid inflow portion is provided on the lower side in the vertical direction with respect to the accommodation portion of the treatment tank, and the treatment liquid outflow portion is provided on the upper side in the vertical direction with respect to the accommodation portion of the treatment tank will be described.

As illustrated in FIG. 1, the organic material removing device 1 includes a column 10 which is a treatment tank.

The column 10 includes a cylindrical column body, a cone-shaped conical portion formed at one end on the lower side in the vertical direction of the column body, and a not-illustrated openable/closable lid which closes an opening at one end on the upper side in the vertical direction of the column body.

In the column body of the column 10, a container 12 for storing a composite material containing an inorganic material and an organic material decomposable by a treatment liquid is accommodated. A portion of the column 10 in which the container 12 is accommodated is defined as an accommodation portion 14.

At an apex portion of a conical portion of the column 10, a treatment liquid inflow portion 16 is provided. The treatment liquid inflow portion 16 is positioned on the lower side in the vertical direction of the accommodation portion 14.

On the upper side of the column 10 in the vertical direction with respect to the accommodation portion 14, a treatment liquid outflow portion 18 is provided.

A baffle plate 22 which is one of rectifying means for rectifying a treatment liquid 20 is provided at the boundary between the column body and the conical portion in the column 10.

The organic material removing device 1 includes a treatment liquid circulation means for allowing the treatment liquid 20 to flow in into the column 10 from the treatment liquid inflow portion 16, and allowing the treatment liquid 20 in the column 10 to flow out from the treatment liquid outflow portion 18.

In the present embodiment, the treatment liquid circulation means includes a storage tank 24 for pooling the treatment liquid 20 to be allowed to flow in into the column 10, a pump P for allowing the treatment liquid 20 pooled in the storage tank 24 to flow in into the column 10, a plurality of pipes constituting a flow path of the treatment liquid 20, and a plurality of valves provided in the piping and regulating the flow of the treatment liquid 20.

The storage tank 24 also has a function of pooling the treatment liquid 20 that has flowed out from the inside of the column 10.

The organic material removing device 1 has temperature control means for heating or cooling the treatment liquid 20.

In the embodiment, the temperature control means includes a heating heat exchanger 26 and a cooling heat exchanger 28.

The organic material removing device 1 may include moving means for accommodating the container 12 in the accommodation portion 14 of the column 10 and taking out the container 12 from the accommodation portion 14 if necessary.

As the moving means, for example, a chain block can be used. The moving means may further include a frame, a guide rail, a sprocket, a chain, a drive shaft, and a position sensor.

The moving means moves the container 12 in the vertical direction and the horizontal direction in FIG. 1 if necessary.

The composite material applicable to the organic material removing device 1 includes an inorganic material and an organic material (hereinafter, also referred to as "first organic material") which is decomposed by a treatment liquid. The composite material may further contain an organic material which is not decomposed by a treatment liquid (hereinafter, also referred to as "second organic material").

Specific examples of the composite material include CFRP, GFRP, a molded coil, a motor coil, and prepreg.

Herein, that an organic material "decomposes" means that the molecular structure of the organic material changes due to an action of a treatment liquid, and the molecular weight decreases to such a size that the organic material can be incorporated into the treatment liquid.

Examples of the first organic material include a resin. When the first organic material is a resin, the resin may be a thermosetting resin or a thermoplastic resin. The resin may be completely cured or solidified, or the resin may be in a state in which the resin is not completely cured or solidified.

When the first organic material is a resin, its type is not particularly limited, and a condition such as components of a treatment liquid, the treatment temperature, and the treatment time is selected depending on the type of the resin. From the viewpoint of ease of decomposition by the treatment liquid, a resin containing an ester bond is preferably used. Examples of the resin containing an ester bond include a polyester resin (unsaturated polyester resin or saturated polyester resin), and an epoxy resin containing an ester bond (acid anhydride cured epoxy resin, glycidyl ester type epoxy resin, or the like). In the composite material, the first organic material may be contained singly or two or more kinds thereof may be contained.

Examples of the second organic material include a thermoplastic resin, and an aramid fiber. The second organic material may be dispersed in the first organic material, may be mixed with the first organic material, may form a member different from the first organic material, or may be in another state.

When the second organic material is a thermoplastic resin, its type is not particularly limited. Examples of thermoplastic resins include a polyolefin resin, a polyacrylic resin, and a polyamide resin. In the composite material, the second organic material may be contained singly, or two or more kinds thereof may be contained.

Examples of the polyolefin resin include polypropylene and polyethylene.

Examples of the polyacrylic resin include polymethyl methacrylate.

Examples of the polyamide resin include nylon 6, 6, nylon 6, nylon 11, and nylon 12.

When the second organic material is aramid fiber, its type is not particularly limited. Examples of the aramid fiber include para-aramid and meta-aramid.

When the second organic material is a thermoplastic resin, its softening point is not particularly limited. From the viewpoint of efficiently removing the second organic material from the composite material, the softening point may be, for example, 235° C. or less, and preferably 150° C. or less. When the second organic material contains two or more thermoplastic resins having different softening points, the highest softening point among them is taken as the softening point of the second organic material.

In the embodiment, the softening point of the resin means a value measured according to JIS K 7206:1999.

Examples of the material of the inorganic material contained in the composite material include carbon, glass, ceramics, a metal, and a semiconductor. The state of the inorganic material in the composite material is not particularly limited, and examples thereof include fibrous, cross, particulate, layered, plate-shaped, and rod-shaped. The inorganic material may be contained singly or in two or more kinds thereof in the composite material.

The shape of the composite material is not particularly limited. The shape of the composite material may be a sheet shape, a plate shape, or a molded article of any shape. The composite material may be cut in such a manner that the separated inorganic material has a desired length or size.

In one embodiment, a sheet-shaped or plate-shaped composite material may be cut into a substantially square shape. By making the shape of the sheet-shaped or plate-shaped composite material substantially square, when a recovered inorganic material is a fiber material such as a carbon fiber, the length of the fiber tends to be substantially uniform. Therefore, this tendency is useful for recycling the recovered fiber material for producing a non-woven fabric or the like.

In one embodiment, the composite material includes a fibrous inorganic material (for example, a carbon fiber), includes a resin (for example, an epoxy resin) containing an ester bond as the first organic material, and includes a thermoplastic resin (for example, a polyolefin resin) containing no ester bond as the second organic material.

The treatment liquid 20 used for the organic material removing device 1 is not particularly limited as long as the liquid can decompose the organic material contained in the composite material (the first organic material when the composite material contains the first organic material and the second organic material). For example, when the organic material includes a resin containing an ester bond, it is preferable to use a treatment liquid which causes decomposition of the ester bond. Example of the treatment liquid which causes decomposition of an ester bond includes a treatment liquid containing an organic solvent and a decomposition catalyst.

When the treatment liquid 20 contains an organic solvent, the kind of the organic solvent is not particularly limited. Examples of the organic solvent include an alcohol solvent, a ketone solvent, an ether solvent, and an amide solvent.

Examples of alcohol solvents include benzyl alcohol, methanol, ethanol, 1-propanol, 2-propanol, 1-butanol, 2-butanol, isobutanol, tert-butanol, 1-pentanol, 2-pentanol, 3-pentanol, 2-methyl-1-butanol, isopentyl alcohol, tert-pentyl alcohol, 3-methyl-2-butanol, neopentyl alcohol, 1-hexanol, 2-methyl-1-pentanol, 4-methyl-2-pentanol, 2-ethyl-1-butanol, 1-heptanol, 2-heptanol, 3-heptanol, cyclohexanol, 1-methylcyclohexanol, 2-methylcyclohexanol, 3-methylcyclohexanol, 4-methylcyclohexanol, ethylene glycol, ethylene glycol monomethyl ether, ethylene glycol monoethyl ether, ethylene glycol monopropyl ether, ethylene glycol monobutyl ether, triethylene glycol, polyethylene glycol (molecular weight: from 200 to 400), 1,2-propanediol, 1,3-propanediol, 1,2-butanediol, 1,3-butanediol, 1,4-butanediol, 2,3-butanediol, glycerin, and dipropylene glycol.

Examples of ketone solvents include diisobutyl ketone, methylcyclohexanone, acetone, methyl ethyl ketone, 2-pentanone, 3-pentanone, 2-hexanone, methyl isobutyl ketone, 2-heptanone, 4-heptanone, cyclohexanone, phorone, and isophorone.

Examples of the ether solvent include dipropyl ether, dibenzyl ether, phenyl benzyl ether, diisopropyl ether, dibutyl ether, dihexyl ether, anisole, phenetole, dioxane, tetrahydrofuran, acetal, ethylene glycol dimethyl ether, diethylene glycol dimethyl ether, and ethylene glycol diethyl ether.

Examples of the amide solvent include N,N-dimethylformamide, and N,N-dimethylacetamide.

Among them, an alcohol solvent is preferable, benzyl alcohol, 1,4-butanediol, and the like are more preferable, and benzyl alcohol is still more preferable from the viewpoint such as resistance to degeneration by heating or the like. The organic solvent may be contained in the treatment liquid 20 singly or in combination of two or more kinds thereof.

The boiling point of the treatment liquid 20 is not particularly limited, and is selected according to the type of the organic material contained in the composite material. In other words, the boiling point of the treatment liquid 20 is selected from a temperature equal to or higher than the temperature at which the organic material contained in the composite material decomposes. When the composite material includes the first organic material and the second organic material as the organic materials, the boiling point of the treatment liquid is selected from a temperature which is equal to or higher than the temperature at which the first organic material decomposes and is equal to or higher than the softening point of the second organic material.

When the treatment liquid 20 contains a decomposition catalyst, examples of the decomposition catalyst include a phosphate and a metal hydroxide. Examples of the phosphate include tripotassium phosphate, tri-rubidium phosphate, trisodium phosphate, and trilithium phosphate. Examples of the metal hydroxide include rubidium hydroxide, potassium hydroxide, sodium hydroxide, and lithium hydroxide.

Among them, a metal hydroxide is preferable, and sodium hydroxide is more preferable from the viewpoints of excellent solubility in organic solvent, high catalytic effect, and the like. The decomposition catalyst may be contained in the treatment liquid 20 singly or two or more kinds thereof. When the treatment liquid 20 contains a decomposition catalyst, the concentration of the decomposition catalyst is not particularly limited. For example, the concentration may be in the range of from 0.4% by mass to 20% by mass.

The shape of the container 12 for storing the composite material is not particularly limited, and can be appropriately selected depending on the shape of a treatment tank. When the treatment tank is a rectangular parallelepiped, the shape of the container 12 is preferably a rectangular parallelepiped.

When the treatment tank is the column 10 according to the embodiment having a cylindrical column body, the shape of the container 12 is preferably cylindrical according to the shape of the column body of the column 10.

Figure 2A:
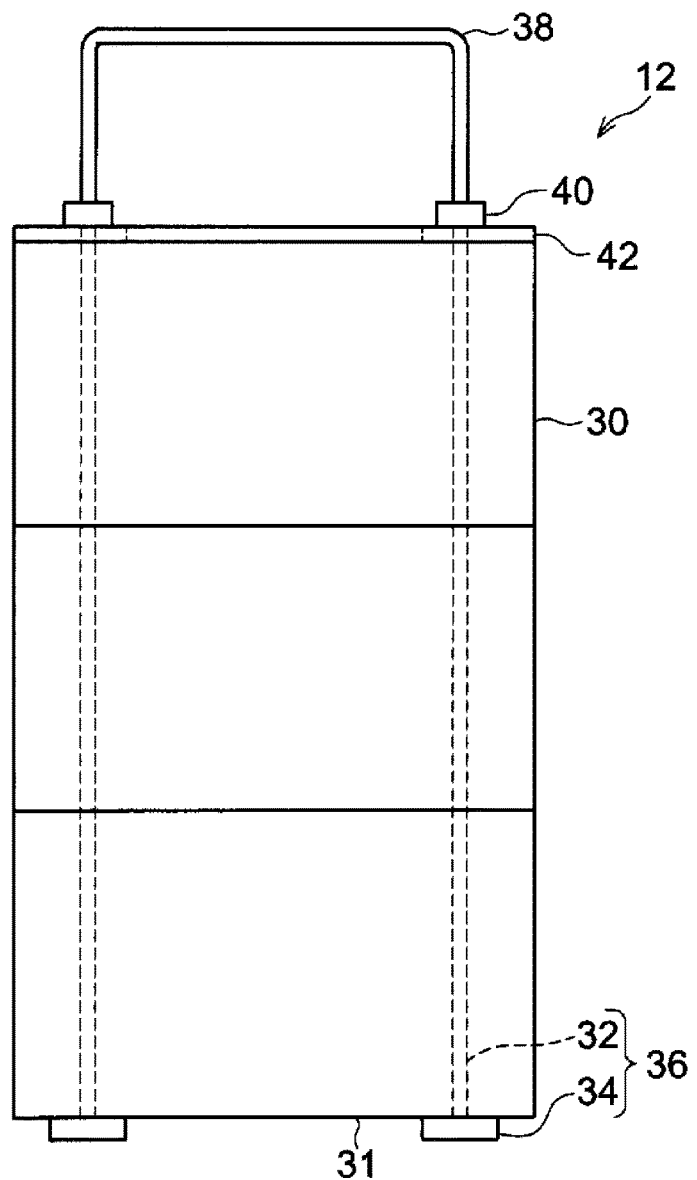
FIG. 2A is a front view of a container 12.
Figure 2B:
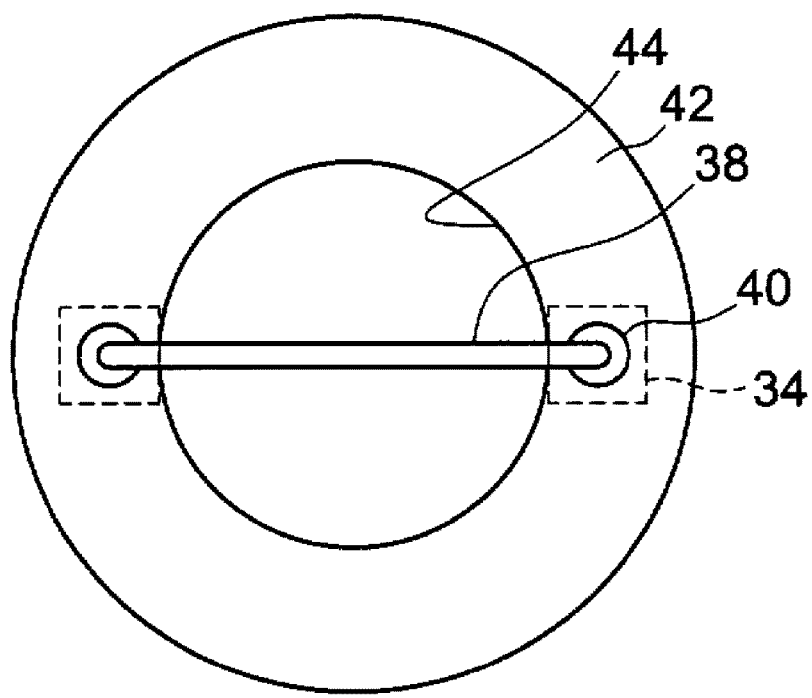
FIG. 2B is a plan view of the container 12.

FIG. 2A and FIG. 2B are views illustrating an example of a container 12 which can be suitably used in the embodiment. FIG. 2A illustrates a front view of the container 12, and FIG. 2B illustrates a plan view of the container 12.

The container 12 illustrated in FIG. 2A and FIG. 2B is formed by integrating three cylindrically-shaped buckets 30 in series in the height direction of the bucket 30.

Figure 3:
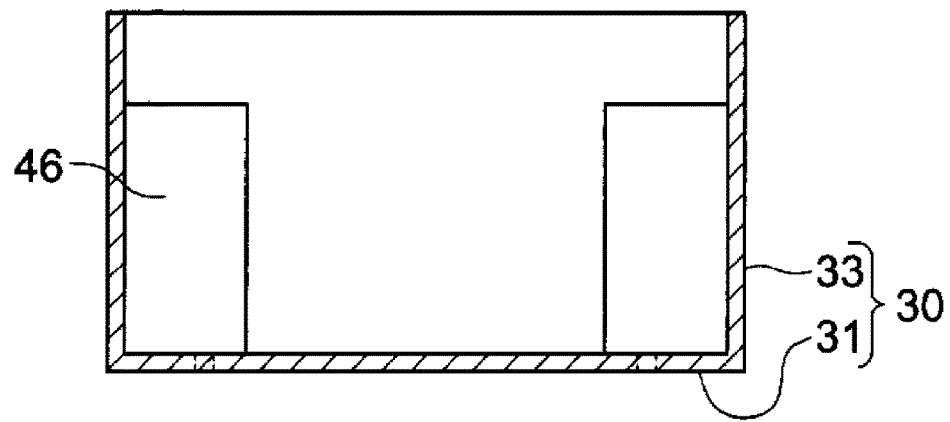
FIG. 3 is a cross-sectional view of a bucket 30.

FIG. 3 is a cross-sectional view of the bucket 30. The bucket 30 includes a bottom portion 31 and a side portion 33 provided in such a manner to rise in the thickness direction of the bottom portion 31 from the outer peripheral portion of the bottom portion 31. The direction in which the side portion 33 rises is the height direction of the bucket 30. The number of buckets is not limited to three. The shape is not limited to a cylindrical shape, and may be a rectangular parallelepiped or the like.

As illustrated in FIGS. 2A and 2B, three buckets 30 are integrated by a connecting member 36 having a connecting rod 32 which passes through three buckets 30 and a supporting plate 34 which supports the bottom portion 31 of the lowermost bucket 30. A handle 38 is attached to the upper side of the connecting member 36 via an attaching member 40, and a hook of a chain block, which is one example of a moving means, is hooked on the handle 38, whereby the container 12 can be easily moved.

Furthermore, a plate-shaped lid 42 is arranged on the upper side of the uppermost bucket 30. In a center portion of the lid 42, a hole 44 is provided in such a manner that the flow of the treatment liquid 20 is not disturbed.

The bucket 30 is configured such that a punching metal, an expanded metal, a wire mesh, and the like are attached to a frame, and a plurality of holes communicating the inside and the outside of the bucket 30 are provided on the surface of the bucket 30 constituting the container 12. Therefore, the treatment liquid 20 can easily pass through the bucket 30. The mesh size, the opening ratio, and the like of the bucket 30 are appropriately set according to the shapes, dimensions, and the like of the composite material and the inorganic material.

The lid 42 may be formed of a plate-shaped member provided with the holes 44, and may also have a configuration in which a punching metal, an expanded metal, a wire mesh, or the like is attached to the frame.

As illustrated in FIG. 3, inside the bucket 30, a partition plate 46 which is one of weir members for arranging the composite material along the flow direction of the treatment liquid 20 may be provided. The number of the partition plates 46 provided inside the bucket 30 is not particularly limited. By providing the partition plate 46 inside the bucket 30, when the plate-shaped composite material is stored in the bucket 30, the composite material can be arranged such that the surface direction of the plate-shaped composite material is along the height direction of the bucket 30, that is, along the flow direction of the treatment liquid 20.

By arranging the surface direction of the plate-shaped composite material along the flow direction of the treatment liquid 20, the flow of the treatment liquid 20 is not easily obstructed. Therefore, the treatment liquid 20 comes into efficient contact with the composite material, and the organic material can be efficiently removed from the composite material.

The weir member may be a plate-shaped member such as the partition plate 46, may be a bar-shaped member extending from the predetermined position of the bottom portion 31 in the height direction of the bucket 30, or may be a member having other shapes, and is not particularly limited as long as the weir member can arrange the composite member along the flow direction of the treatment liquid 20.

Figure 4:
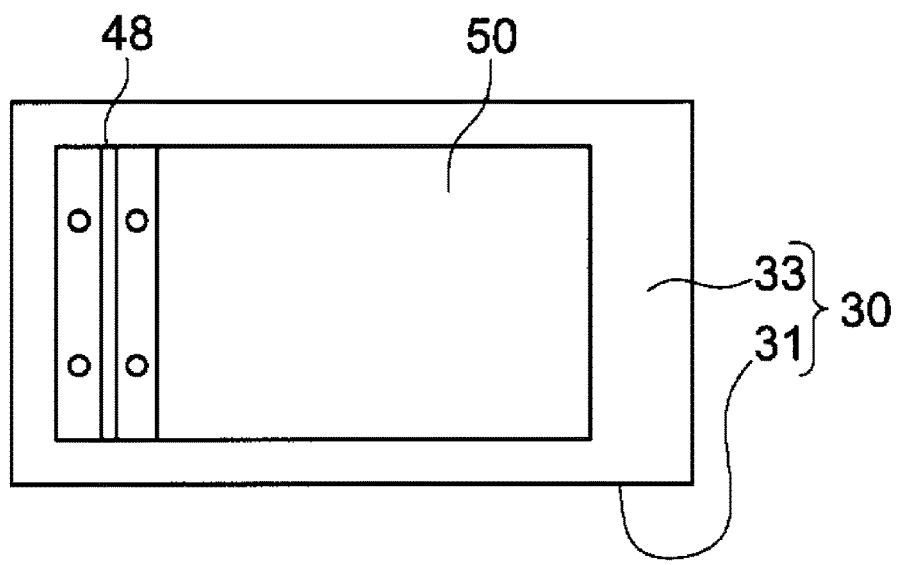
FIG. 4 is a front view illustrating another example of the bucket 30.

FIG. 4 is a front view illustrating another example of the bucket 30. A window portion 50 is attached to the side portion 33 of the bucket 30 in FIG. 4 via a hinge 48. The window portion 50 is openable/closable toward the outside of the side portion 33.

Figure 5A:
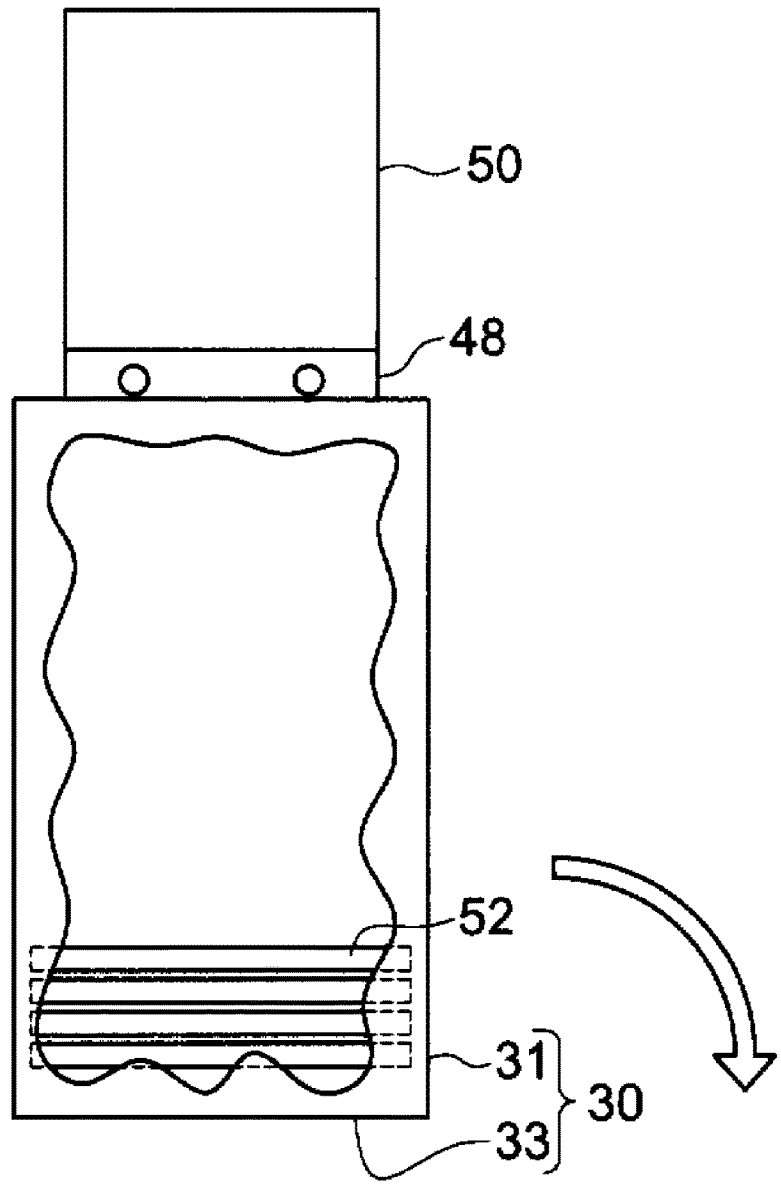
FIG. 5A is a diagram illustrating a state in which the bucket 30 is arranged in such a manner that a window portion 50 is opened toward the outside of a side portion 33, and that a portion of the side portion 33 of the bucket 30 opposed to a position where a window portion 50 is attached is grounded.
Figure 5B:
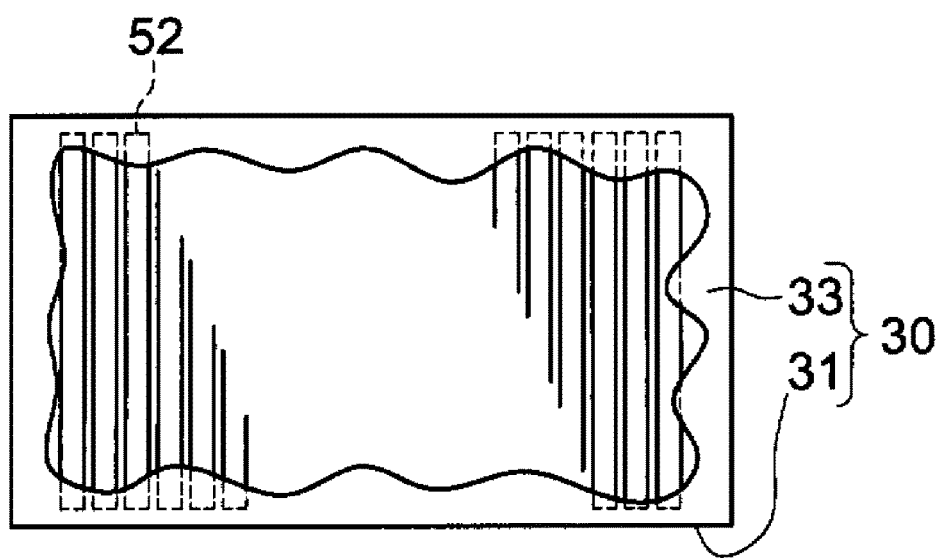
FIG. 5B is a view illustrating a state in which the bucket 30 is arranged in such a manner that the window portion 50 is closed, and that a bottom portion 31 of the bucket 30 is grounded.

FIG. 5A and FIG. 5B are diagrams for explaining a method of storing the plate-shaped composite material 52 in the bucket 30 having the window portion 50. In FIG. 5A, the bucket 30 is arranged in a state in which the window portion 50 is opened toward the outside of the side portion 33 and a portion of the side portion 33 of the bucket 30 opposed to the position where the window portion 50 is attached is grounded, and in FIG. 5B, the bucket 30 is arranged with the window portion 50 closed and the bottom portion 31 of the bucket 30 grounded. In FIG. 5A and FIG. 5B, a part of the side portion 33 of the bucket 30 is cut out to easily explain the state of the plate-shaped composite material 52.

As illustrated in FIG. 5A, the window portion 50 of the bucket 30 is opened toward the outside of the side portion 33, and in a state in which a portion of the side portion 33 of the bucket 30 opposed to the position where the window portion 50 is attached is grounded, the plate-shaped composite material 52 is stored in the bucket 30 through the window portion 50. Since the portion of the side portion 33 of the bucket 30 opposed to the position where the window portion 50 is attached is grounded, when the plate-shaped composite material 52 is stored in the bucket 30 through the window portion 50, the surface direction of the plate-shaped composite material 52 is stacked in the direction along the height direction of the bucket 30.

Thereafter, by closing the window portion 50 and tilting the bucket 30 in the direction of the arrow, the bucket 30 is arranged in such a manner that the bottom portion 31 of the bucket 30 is grounded (FIG. 5B), whereby the plate-shaped composite material 52 can be arranged in the bucket 30 such that the plane direction of the plate-shaped composite material 52 is along the height direction of the bucket 30.

The material of the column 10 is not particularly limited, and stainless steel (SUS303, SUS316, or the like), HASTELLOY (HASTELLOY B, HASTELLOY B-2, HASTELLOY C276, or the like), or the like excellent in corrosion resistance to the heated treatment liquid 20 can be used.

In the embodiment, the column 10 having a cylindrical column body and a cone-shaped conical portion formed at one end on the lower side in the vertical direction of the column body is used as a treatment tank. The shape of the treatment tank is not limited to a cylindrical shape, and may be a rectangular parallelepiped or the like.

From the viewpoint of controlling the flow direction of the heated treatment liquid 20 in a fixed direction, the ratio (distance/length) of the distance from the treatment liquid inflow portion to the treatment liquid outflow portion in a treatment tank to the maximum length of the cross section when the treatment tank is observed from the flow direction of the treatment liquid 20 is preferably from 1 to 20, more preferably from 2 to 10, and still more preferably from 3 to 5. Here, the maximum length of the cross section of the treatment tank is as follows.

When the cross section of the treatment tank is circular, the maximum length of the cross section of the treatment tank is the diameter of the circle.

When the cross section of the treatment tank is rectangular, the maximum length of the cross section of the treatment tank is the length of a diagonal line of the rectangular.

When the cross section of the treatment tank has another shape, the maximum length of the cross section of the treatment tank is the diameter of the circle circumscribing the cross section of the treatment tank.

The shape of the baffle plate 22 provided at the boundary between the column body and the conical portion in the column 10 is not particularly limited. The baffle plate 22 may be, for example, a plate member in a disk shape covering one end on the lower side in the vertical direction of the cylindrical column body, having a plurality of holes, and being insoluble in the treatment liquid 20. By providing the baffle plate 22 in the column 10, the flow of the treatment liquid 20 is adjusted before the treatment liquid 20 reaches the accommodation portion 14, thereby preventing uneven flow of the treatment liquid 20 flowing from the treatment liquid inflow portion 16 into the column 10. Therefore, the treatment liquid 20 comes into more efficient contact with the composite material, whereby the organic material can be more efficiently removed from the composite material.

Examples of other rectifying means other than the baffle plate 22 include a plurality of rectifying plates arranged at predetermined intervals along the flow direction of the treatment liquid.

In order to prevent uneven flow in the treatment liquid 20 in the column 10, the area of the accommodation portion 14 preferably matches the area occupied by the container 12 as much as possible when observing from the flow direction of the treatment liquid 20 in the column 10. By matching the area of the accommodation portion 14 with the area occupied by the container 12, the amount of the treatment liquid 20 flowing out of the column 10 without passing through the container 12 can be reduced. By this, the amount of the treatment liquid 20 which does not contribute to the treatment of the composite material is reduced, and the organic material can be more efficiently removed from the composite material.

When observing from the flow direction of the treatment liquid 20 in the column 10, the area occupied by the container 12 when the area of the accommodation portion 14 is 100 is preferably 80 or more.

When observing from the flow direction of the treatment liquid 20 in the column 10, the composite material stored in the container 12 is preferably not unevenly arranged. An uneven flow of the treatment liquid 20 in the container 12 can be prevented by suppressing uneven arrangement of the composite materials stored in the container 12. Therefore, the treatment liquid 20 comes into efficient contact with the composite material, and the organic material can be efficiently removed from the composite material.

The temperature control means of the organic material removing device 1 includes a heating heat exchanger 26 and a cooling heat exchanger 28.

By circulating a heating medium oil (HM) in the heating heat exchanger 26, the treatment liquid 20 can be heated. By circulating the cooling water (CW) in the cooling heat exchanger 28, the treatment liquid 20 can be cooled.

Therefore, at the time of start-up of or during normal operation of the organic material removing device 1, the treatment liquid 20 can be heated by the heating heat exchanger 26, and the temperature of the treatment liquid 20 can be stabilized. At the time of falling of or in case of emergency of the organic material removing device 1, the temperature of the treatment liquid 20 can be cooled to a predetermined temperature by the cooling heat exchanger 28, and the organic material removing device 1 can be safely stopped.

The means for heating the treatment liquid 20 in the temperature control means is not limited to the heating heat exchanger 26, and a heating heater, a microwave heater, a dielectric heater, or the like can be used. The means for cooling the treatment liquid 20 in the temperature control means is not limited to the cooling heat exchanger 28, and a variety of cooling means such as a water cooling method or an air cooling method can be used.

The treatment liquid circulation means of the organic material removing device 1 controls the circulation of the treatment liquid 20 by starting and stopping a pump P and opening and closing a plurality of valves which are provided in the piping and regulate the flow of the treatment liquid 20. Starting and stopping of the pump P and opening and closing of the valves are controlled by control means (not illustrated).

The volume of the storage tank 24 is not particularly limited, and can be appropriately selected in consideration of the volume of the column 10.

Next, an example of the operation of the organic material removing device 1 from a state in which the container 12 is not accommodated in the column 10 and the column 10 is not filled with the treatment liquid 20 is described in the organic material removing device 1.

First, a lid (not illustrated) in the column 10 is opened, the container 12 storing a composite material containing an inorganic material and an organic material decomposable by a treatment liquid is accommodated in the accommodation portion 14 in the column 10 by unillustrated moving means, and then the lid (not illustrated) in the column 10 is closed.

The treatment liquid 20 is introduced into the storage tank 24 along the arrow R, and the treatment liquid 20 is pooled in the storage tank 24. As the treatment liquid 20, an unused treatment liquid may be used, a treatment liquid subjected to a recycling treatment to be described below may be used, or an unused treatment liquid and a treatment liquid subjected to a recycling treatment may be used in combination.

A valve A is opened, and a valve B, a valve C, and a valve D are closed. The pump P is driven, and the treatment liquid 20 stored in the storage tank 24 passes through the valve A and the heating heat exchanger 26 and flows into the column 10 from the treatment liquid inflow portion 16. When the inside of the column 10 is filled with the treatment liquid 20, an excess treatment liquid 20 flows out from the treatment liquid outflow portion 18 to the outside of the column 10 and is pooled in the storage tank 24 again.

When the treatment liquid 20 flows into the column 10 from the treatment liquid inflow portion 16 and the excess treatment liquid 20 flows out from the treatment liquid outflow portion 18 to the outside of the column 10, a flow (upward flow) of the treatment liquid 20 from the treatment liquid inflow portion 16 to the treatment liquid outflow portion 18 is formed in the column 10.

By circulating the heating medium oil (HM) in the heating heat exchanger 26, the treatment liquid 20 passing through the heating heat exchanger 26 is heated. As a result, the temperature of the treatment liquid 20 rises, and in the column 10, decomposition and removal of the organic material by the treatment liquid 20 is started. The temperature of the treatment liquid 20 is monitored by a temperature sensor (not illustrated), and the circulation amount of the heating medium oil to the heating heat exchanger 26 is adjusted according to the temperature of the treatment liquid 20. By adjusting the circulation amount of the heating medium oil to the heating heat exchanger 26, the temperature of the treatment liquid 20 is adjusted.

When the temperature profile of the treatment liquid 20 is set to at least two stages as described below, for example, by appropriately adjusting the amount of the treatment liquid 20 to be heated by the heating heat exchanger 26 and the amount of the treatment liquid 20 to be cooled by the cooling heat exchanger 28, the treatment liquid 20 can be heated to a desired temperature condition.

When the heated treatment liquid 20 flows into the column 10, decomposition of the organic material contained in the composite material is promoted, a decomposition product of the organic material is dispersed or dissolved in the treatment liquid 20, and the organic material is removed from the composite material. The inorganic material contained in the composite material remains in the container 12.

The temperature of the treatment liquid 20 is appropriately selected depending on the kind, amount, and the like of the organic material contained in the composite material.

The treatment time with the treatment liquid 20 is also appropriately selected depending on the kind and amount of the organic material contained in the composite material.

After a predetermined time has elapsed, the circulation of the heating medium oil (HM) to the heating heat exchanger 26 is stopped. On the other hand, cooling water (CW) is circulated to the cooling heat exchanger 28. Then, the valve A is closed and the valve B is opened. As a result, the temperature of the treatment liquid 20 decreases.

After the temperature of the treatment liquid 20 drops to a safe temperature for taking out, circulation of the cooling water (CW) to the cooling heat exchanger 28 is stopped, and the operation of the pump P is stopped. Thereafter, the valve A, the valve C, and the valve D are opened, and the treatment liquid 20 in the organic material removing device 1 is discharged along the arrow S. By discharging the treatment liquid 20 from inside the organic material removing device 1, draining of the inorganic material remaining in the container 12 is performed.

After discharging the treatment liquid 20 in the organic material removing device 1, a lid (not illustrated) in the column 10 is opened, and the container 12 is taken out from the accommodation portion 14 in the column 10 by a moving means (not illustrated). The inorganic material remaining in the container 12 is collected and used for reuse.

In the treatment liquid 20 discharged from the inside of the organic material removing device 1, decomposition products of organic materials or the like are dispersed or dissolved. Furthermore, low boiling point components such as moisture may be contained in the treatment liquid 20. In order to recycle the treatment liquid 20, the treatment liquid 20 may be subjected to a recycling treatment for removing an organic component such as a decomposition product of an organic material, a low boiling point component such as moisture from the treatment liquid 20 if necessary.

The method of recycling treatment of the treatment liquid 20 is not particularly limited, and for example, the treatment liquid can be recycled through an evaporation step of removing an organic component such as a decomposition product of an organic material from the treatment liquid 20, a distillation step of removing a low boiling point component from the treatment liquid 20 obtained through the evaporation step, and a catalyst preparation step of adding a catalyst to the treatment liquid 20 obtained through the distillation step if necessary.

An organic component such as a decomposition product of an organic material obtained in the evaporation step can be reused as an auxiliary fuel (for example, mixed with a solid fuel).

The temperature profile of the treatment liquid 20 at the time of decomposing and removing the organic material, such as the temperature of the treatment liquid 20 or the treatment time by the treatment liquid 20, is not particularly limited, and a treatment may be performed at a predetermined temperature for a predetermined time, or the temperature of the treatment liquid 20 may be set to at least two stages.

For example, when a composite material containing an inorganic material, the first organic material, and the second organic material is treated by the organic material removing device 1, a stage of setting the temperature of the treatment liquid 20 to be equal to or higher than the softening point of the second organic material may be provided. By making the temperature of the treatment liquid 20 equal to or higher than the softening point of the second organic material, the second organic material, which is not decomposed by the treatment liquid 20, softens and is easily removed from the composite material.

One example of a temperature profile of the treatment liquid 20 when a composite material such as prepreg in which curing or solidification of an organic material is not completely completed preferably includes: a first stage in which the temperature of the treatment liquid 20 is maintained at a temperature at which hardening or solidification of the organic material is not easily promoted; and a second stage in which the temperature is maintained at a temperature higher than the temperature condition of the first stage, in the order mentioned.

In cases in which a composite material such as prepreg in which curing or solidification of an organic material is not completely completed is treated, when the temperature of the treatment liquid 20 is raised at a stretch, since a resin curing reaction may occur due to the heat of the treatment liquid 20 while the organic material is removed by the treatment liquid 20, curing of the organic material may proceed depending on the state of contact between the treatment liquid 20 and the composite material, and there is a possibility that it may become difficult for removal of the organic material to proceed.

Since the heating condition of the treatment liquid 20 includes the first stage and the second stage in this order, curing or the like of the organic material contained in the composite material in which curing or solidification is not completely completed is suppressed, and the removal efficiency of the organic material tends to be improved.

When the temperature profile of the treatment liquid 20 includes the first stage and the second stage in this order, the temperature and treatment time of the treatment liquid 20 at each stage can be selected according to the kind, state, amount, or the like of the first organic material and the second organic material, but is not particularly limited thereto. For example, the temperature of the treatment liquid 20 in the first stage may be in the range of from 30° C. to 190° C., the treatment time in the first stage may be in the range of from 1 minute to 180 minutes, the temperature of the treatment liquid 20 in the second stage can be in the range of from 100° C. to 235° C., and the treatment time in the second stage can be in the range of from 1 minute to 720 minutes.

In the above example, the treatment liquid 20 is discharged from the organic material removing device 1 after the temperature of the treatment liquid 20 is lowered to a safe temperature for taking out, and when the second organic material is contained in the composite material, the treatment liquid may be discharged in a state in which the temperature of the treatment liquid 20 is equal to or higher than the softening point of the second organic material. The second organic material can be prevented from re-adhering to the inorganic material by discharging from the inside of the organic material removing device 1 with the temperature of the treatment liquid 20 being equal to or higher than the softening point of the second organic material.

Furthermore, after the treatment liquid 20 is discharged from the inside of the organic material removing device 1, the series of operations described above may be repeated in order to again remove the organic material adhering to the inorganic material using the new treatment liquid 20.

In the organic material removing device 1, the heated treatment liquid 20 is circulated upward in the vertical direction, but the flow direction of the treatment liquid 20 is not limited thereto, and may be circulated downward in the vertical direction. In order to circulate the treatment liquid downward in the vertical direction, for example, in the organic material removing device 1, a pipe connected to the treatment liquid inflow portion 16 may be connected to the treatment liquid outflow portion 18, and a pipe connected to the treatment liquid inflow portion 18 may be connected to the treatment liquid outflow portion 16. When the organic material removing device 1 has such a configuration, the treatment liquid 20 can be circulated downward in the vertical direction.

Figure 6:
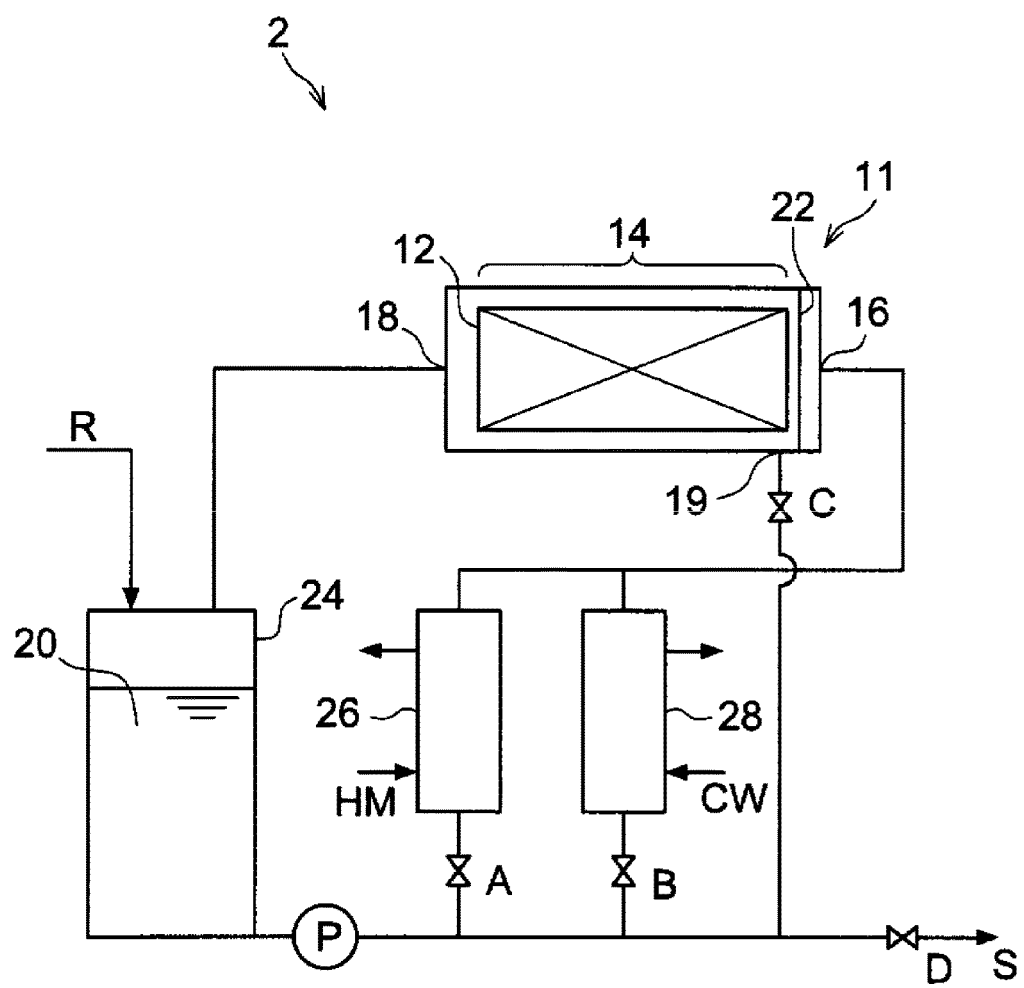
FIG. 6 is a schematic view illustrating a main part of an organic material removing device 2 which is another example of the embodiment.

FIG. 6 is a schematic diagram illustrating a main part of an organic material removing device 2 which is another example of the embodiment. In FIG. 6, an aspect in which the longitudinal direction of the substantially rectangular parallelepiped treatment tank is arranged along the horizontal direction will be described.

As illustrated in FIG. 6, the organic material removing device 2 has a treatment tank 11 as a treatment tank.

The treatment tank 11 has a substantially rectangular parallelepiped shape, and the treatment tank 11 is arranged in such a manner that the longitudinal direction of the substantially rectangular parallelepiped is along the horizontal direction.

An unillustrated opening is provided in the upper portion of the treatment tank 11, and the treatment tank can be accommodated in the container 12 or the container 12 can be taken out therefrom. The unillustrated opening is closed with an unillustrated openable/closable lid.

In the treatment tank 11, a container 12 for storing a composite material containing an inorganic material and an organic material decomposable by a treatment liquid is accommodated. A portion of the treatment tank 11 in which the container 12 is accommodated is defined as an accommodation portion 14.

A treatment liquid inflow portion 16 is provided at one longitudinal end of the treatment tank 11, and a treatment liquid outflow portion 18 is provided at the other longitudinal end.

A baffle plate 22, which is one of rectifying means for rectifying the treatment liquid 20, is provided between the accommodation portion 14 of the treatment tank 11 and a portion where the treatment liquid inflow portion 16 is provided.

At the bottom portion of the treatment tank 11, a discharge valve 19 for discharging the treatment liquid 20 from the treatment tank 11 is provided, and by opening a valve C, the treatment liquid 20 can be discharged from the treatment tank 11.

Other constituent elements of the organic material removing device 2, the operation of the organic material removing device 2, treatment conditions for removing the organic material, and the like can be the same as in the case of the organic material removing device 1.

In the above embodiment, the organic material removing device including one treatment tank is described, but the organic material removing device of the embodiment may include two or more treatment tanks. For example, when the organic material removing device has two treatment tanks, the treatment liquid flowing out from the treatment liquid outflow portion in the first treatment tank can be configured to be flowed into the second treatment tank from the treatment liquid inflow portion in the second treatment tank.

All publications, patent applications, and technical standards mentioned in this specification are herein incorporated by reference to the same extent as if such individual publication, patent application, or technical standard was specifically and individually indicated to be incorporated by reference.

The invention claimed is:

1. An organic material removing device comprising:
a container for storing a composite material containing an inorganic material and an organic material decomposable by a treatment liquid, the container comprising a plurality of buckets, each of the plurality of buckets having a bottom portion and a side portion rising from the bottom portion in a height direction of the bucket, the plurality of buckets being integrated in series in the height direction of the buckets;
a treatment tank including an accommodation portion for accommodating the container, a treatment liquid inflow portion for allowing the treatment liquid to flow in, and a treatment liquid outflow portion for allowing the treatment liquid to flow out;
a temperature controller configured to heat or cool the treatment liquid; and
a treatment liquid circulator configured to allow the treatment liquid to flow in from the treatment liquid inflow portion into the treatment tank and to allow the treatment liquid in the treatment tank to flow out from the treatment liquid outflow portion.

2. The organic material removing device according to claim 1, wherein the treatment liquid inflow portion is provided on a lower side in a vertical direction with respect to the accommodation portion of the treatment tank, and the treatment liquid outflow portion is provided on an upper side in the vertical direction with respect to the accommodation portion of the treatment tank.

3. The organic material removing device according to claim 1, wherein the treatment tank is provided with a rectifier configured to rectify the treatment liquid between the accommodation portion and the treatment liquid inflow portion.

4. The organic material removing device according to claim 1, wherein each of the plurality of buckets is provided with a weir member for arranging the composite material along a flow direction of the treatment liquid.

5. The organic material removing device according to claim 1, further comprising the composite material stored in the container, wherein the organic material decomposable by the treatment liquid is a resin containing an ester bond.

6. The organic material removing device according to claim 1, further comprising the composite material stored in the container, wherein the inorganic material is carbon, glass, ceramics, a metal, or a semiconductor.

7. The organic material removing device according to claim 1, further comprising the composite material stored in the container, wherein the composite material further contains an organic material which is not decomposed by the treatment liquid.

8. The organic material removing device according to claim 7, wherein the organic material which is not decomposed by the treatment liquid is a thermoplastic resin or an aramid fiber.

9. The organic material removing device according to claim 1, further comprising the composite material stored in the container, wherein the composite material contains a fibrous inorganic material, a resin containing an ester bond as the organic material decomposable by the treatment liquid, and a thermoplastic resin containing no ester bond as an organic material which is not decomposed by the treatment liquid.

10. The organic material removing device according to claim 1, wherein the treatment liquid circulator comprises a storage tank including the treatment liquid stored therein, the storage tank being operably connected to the treatment liquid inflow portion of the treatment tank and to the treatment liquid outflow portion of the treatment tank, wherein the treatment liquid contains an organic solvent and a decomposition catalyst.

11. The organic material removing device according to claim 10, wherein the organic solvent contains an alcohol solvent, a ketone solvent, an ether solvent, or an amide solvent.

12. The organic material removing device according to claim 10, wherein the decomposition catalyst contains a phosphate or a metal hydroxide.

13. The organic material removing device according to claim 1, wherein a ratio (distance/length) of a distance from the treatment liquid inflow portion to the treatment liquid outflow portion in the treatment tank to a maximum length of a cross section when the treatment tank is observed from a flow direction of the treatment liquid is from 1 to 20.

* * * * *